(12) United States Patent
Shimahara

(10) Patent No.: US 12,140,424 B2
(45) Date of Patent: Nov. 12, 2024

(54) RESOLVER

(71) Applicants: Futaba Corporation, Mobara (JP);
Shiro Shimahara, Ueda (JP)

(72) Inventor: Shiro Shimahara, Ueda (JP)

(73) Assignees: FUTABA CORPORATION, Mobara
(JP); Shiro Shimahara, Ueda (JP)

( * ) Notice: Subject to any disclaimer, the term of this patent is extended or adjusted under 35 U.S.C. 154(b) by 127 days.

(21) Appl. No.: 17/917,035

(22) PCT Filed: Aug. 4, 2020

(86) PCT No.: PCT/JP2020/029876
§ 371 (c)(1),
(2) Date: Oct. 5, 2022

(87) PCT Pub. No.: WO2021/205676
PCT Pub. Date: Oct. 14, 2021

(65) Prior Publication Data
US 2023/0146396 A1 May 11, 2023

(30) Foreign Application Priority Data
Apr. 6, 2020 (JP) .............................. 2020-068130

(51) Int. Cl.
*G01B 7/30* (2006.01)
*H01F 27/28* (2006.01)

(52) U.S. Cl.
CPC .......... *G01B 7/30* (2013.01); *H01F 27/2847* (2013.01)

(58) Field of Classification Search
None
See application file for complete search history.

(56) References Cited

U.S. PATENT DOCUMENTS 6,236,199 B1   5/2001   Irle et al.
6,239,571 B1 *  5/2001   Shimahara ........... G01D 5/2086
                                                                    340/870.18

FOREIGN PATENT DOCUMENTS

JP   2000-292205 A   10/2000
JP   2001-194183 A    7/2001
JP   2008-309598 A   12/2008

OTHER PUBLICATIONS

International Search Report (PCT/ISA/210), issued in PCT/JP2020/029876, dated Oct. 13, 2020.

* cited by examiner

*Primary Examiner* — Farhana A Hoque
(74) *Attorney, Agent, or Firm* — Birch, Stewart, Kolasch & Birch, LLP

(57) ABSTRACT

Excitation windings 2X, 2Y and a detection winding configured in a multipolar mode are disposed coaxially with a fixed body, a plurality of sets (M1, M2) of intermediate rotating windings M1 . . . configured by a pair of winding portions Mx1, My1 . . . configured by the multipolar mode and with predetermined electrical phases D made different are disposed coaxially with a rotating body, and the winding portions in the same phase (Mx1 and Mx2, My1 and My2) of the plural sets of the intermediate rotating windings M1, M2 are connected so as to form closed circuits H . . . , respectively.

12 Claims, 7 Drawing Sheets

RESOLVER

TECHNICAL FIELD

The present invention relates to a resolver, which is suitably used when a displacement amount (rotation angle) of a rotating body is detected, by including an excitation winding and a detection winding.

BACKGROUND ART

Conventionally, a resolver having excitation windings in two phases provided by being fixed to spatial positions with a phase difference by an electric angle of 90° and to which excitation signals are input and a detection winding provided on a rotating shaft and from which a detection signal is output, in which a rotation angle of the rotating shaft is detected from the phase difference between the excitation signal and the detection signal is known. In this type of resolver, supposing that the rotation angle of the rotating shaft is θ, one of the phases of the excitation winding is sin θ and the other phase is cos θ. Here, when the excitation signals (A·sin ωt) and (A·cos ωt) with the phases different by 90° are given to the excitation windings, the detection signal output from the detection winding is V=(A·sin ωt·cos θ)+ (A·cos ωt·sin θ)=A·sin (ωt+θ), and since the detection signal whose phase is changed in accordance with the rotation angle of the rotating shaft, the rotation angle θ of the rotating shaft can be acquired from the phase difference between the excitation signals and the detection signal.

On the other hand, the applicant has already proposed a resolver which can realize higher detection accuracy by using a demodulation signal and can achieve size reduction, weight reduction, and cost reduction at the same time in Patent Literature 1. This resolver has the excitation winding to which the excitation signal is input and the detection winding from which the detection signal is output, and when a resolver, which detects a displacement amount of a receiving body on the basis of the detection signal changing in accordance with the displacement amount of the receiving body on which the excitation winding or the detection winding is provided, is to be configured, a modulation signal obtained by modulating a high-frequency signal by the excitation signal is input to the excitation winding, and the detection signal is obtained by demodulating the modulation signal output from the detection winding.

PRIOR ART PUBLICATIONS

Patent Publications

Patent Document 1: Japanese Patent Application Publication No. 2000-292205

DISCLOSURE OF THE INVENTION

Problem Solved by the Invention

However, the resolver in the aforementioned Patent Literature 1 has the following problems to be further improved from a viewpoint of size reduction or particularly super size-reduction.

That is, in this type of the resolver, when the excitation winding and the detection winding are to be configured, they are configured by a coil pattern in a rectangular wave shape along a circumferential direction by combining a conductor portion in the circumferential direction and a conductor portion in a radial direction, but when a small-sized resolver or particularly a super small-sized resolver with a diameter of approximately 5 [mm] is to be realized, it is necessary to set a pitch between the conductors in the radial direction in the coil pattern to approximately 0.5 [mm] and the number of poles in one circle to approximately 32 poles (the number of pole pairs is 16) by this pitch. Normally, the larger the number of poles becomes, the higher detection accuracy can be realized, but on the other hand, since preciseness is required for machining accuracy, a manufacturing cost cannot be ignorable, and there is a problem that the accuracy could be rather lowered due to limitation on the machining.

In the end, in order to achieve size reduction (super size-reduction) of the resolver, since the increase of the number of poles, while a cost merit is ensured, is limited, there has been a problem to be solved that demand for higher detection accuracy and moreover for higher stability and higher reliability cannot be sufficiently satisfied.

The present invention has an object to provide a resolver which solves the problems as above which are present in the background art.

Means for Solving the Problem

In order to solve the problems described above, the present invention is characterized in that, when such a resolver 1 is to be configured including a fixed body 4 and a rotating body 5 disposed coaxially, excitation signals Sx, Sy being input to a pair of excitation windings 2x, 2y disposed on the fixed body 4 with predetermined electrical phases D made different, and a displacement amount θ of the rotating body 5 being detected on the basis of a detection signal So output from a detection winding 3, the excitation windings 2x, 2y and the detection winding 3 configured in a multipolar mode are disposed coaxially with the fixed body 4, a plurality of sets (M1, M2) of intermediate rotating windings M1 . . . configured in the multipolar mode and by a pair of winding portions Mx1, My1 . . . with the predetermined electrical phases D made different are disposed coaxially with the rotating body 5, and the winding portions in the same phase (Mx1 and Mx2, My1 and My2) of the plurality of sets of intermediate rotating windings M1, M2 are connected, respectively, so as to form closed circuits H . . . .

In this case, according to a preferred embodiment of the invention, it may be so configured that the fixed body 4 and the rotating body 5 are configured in a disc shape B, respectively, the excitation windings 2x, 2y and the detection winding 3 are disposed at different positions in a radial direction Fd of the fixed body 4, and the plural sets of the intermediate rotating windings M1, M2 are disposed by being opposed to the excitation windings 2x, 2y and the detection winding 3, or it may be so configured that the fixed body 4 and the rotating body 5 are configured in a cylindrical shape R, respectively, the excitation windings 2x, 2y and the detection winding 3 are disposed at different positions in an axial direction Fc of the fixed body 4, and the plural sets of the intermediate rotating windings M1, M2 are disposed by being opposed to the excitation windings 2x, 2y and the detection winding 3. On the other hand, on the fixed body 4 and the rotating body 5, position-detection windings Xp, Xm that detect a reference position of the rotating body 5 can be provided on a region other than the region on which the excitation windings 2x, 2y and the detection winding 3 are disposed. Moreover, the excitation windings 2x, 2y and intermediate rotating windings M1, M2 can be configured by sheet coils Ci, Cm1, Cm2 in which a pair of coil patterns P, P with the predetermined electrical phases D made different by the multipolar mode formed on a front and a back, respectively, and the detection winding 3 can be formed by a sheet coil Co in which the coil pattern P in the multipolar mode is disposed at least on one of the front and the back. Furthermore, the coil pattern P can be formed in a square wave shape along a circumferential direction Ff by combining conductor portions in the circumferential direction Ff (hereinafter referred to as circumferential conductor portions) Wo . . . , Wi . . . and conductor portions in a radial direction Fd (hereinafter referred to as radial conductor portions) Wm . . . , and width dimensions Lo, Li of the circumferential conductor portions Wo . . . , Wi . . . can be set larger than a width dimension Lm of the radial conductor portions Wm . . . .

ADVANTAGEOUS EFFECTS OF INVENTION

Effects of the Invention

According to the resolver 1 according to the present invention, having the configuration as above, the following marked effects are exerted.

(1) Since the excitation windings 2x, 2y and the detection winding 3 configured in the multipolar mode are disposed coaxially with the fixed body 4, the plural sets (M1, M2) of the intermediate rotating windings M1 . . . configured by the pair of winding portions Mx1, My1 . . . configured in the multipolar mode and with the predetermined electrical phases D made different are disposed coaxially with the rotating body 5, and the winding portions in the same phase (Mx1 and Mx2, My1 and My2) of the plural sets of the intermediate rotating windings M1, M2 are connected so as to form the closed circuits H . . . , respectively, the substantial number of poles can be increased while the machining accuracy is ensured, and the small-sized resolver 1 which can sufficiently satisfy the demand for higher detection accuracy and moreover, higher stability and higher reliability, and particularly the super small-sized resolver 1 with the diameter of approximately 5 [mm] can be easily realized. Moreover, since an output transformer can be excluded by disposing the detection winding 3 on the fixed body 4, contribution can be made to further size reduction and cost reduction.

(2) According to the preferred embodiment, by configuring the fixed body 4 and the rotating body 5 in the disc shape B, respectively, by disposing the excitation windings 2x, 2y and the detection winding 3 at the different positions in the radial direction Fd of the fixed body 4, and by disposing the plural sets of the intermediate rotating windings M1, M2 by being opposed to the excitation windings 2x, 2y and the detection winding 3, particularly an entire thickness in the axial direction Fc can be reduced and thus, a thin-type resolver 1 can be easily obtained.

(3) According to the preferred embodiment, by configuring the fixed body 4 and the rotating body 5 in the cylindrical shape R, respectively, by disposing the excitation windings 2x, 2y and the detection winding 3 at the different positions in the axial direction Fc of the fixed body 4, and by disposing the plural sets of the intermediate rotating windings M1, M2 by being opposed to the excitation windings 2x, 2y and the detection winding 3, particularly an entire dimension in the radial direction Fd can be reduced and thus, a narrow-type resolver 1 can be easily obtained, and wirings such as connecting cables and the like can be passed through a space formed inside.

(4) According to the preferred embodiment, by providing the position-detection windings Xp, Xm that detect a reference position of the rotating body 5 on the region other than the region on which the excitation windings 2x, 2y and the detection winding 3 are disposed in the fixed body 4 and the rotating body 5, an absolute type resolver 1 can be easily constructed by effectively using an unused region such that a mechanical one-rotation position of the rotating body 5 can be accurately detected or the like, for example.

(5) According to the preferred embodiment, by configuring the excitation windings 2x, 2y and the intermediate rotating windings M1, M2 by the sheet coils Ci, Cm1, Cm2 in which the pair of coil patterns P, P with the predetermined electrical phases D made different by the multipolar mode formed on the front and the back, respectively, the entire thickness including the excitation windings 2x, 2y and the intermediate rotating windings M1, M2 can be thinned and thus, an optimal form can be embodied in realization of the super small-sized resolver.

(6) According to the preferred embodiment, by forming the detection winding 3 by the sheet coil Co in which the coil pattern P in the multipolar mode is disposed at least on one of the front and the back, the entire thickness of the detection winding 3 can be thinned and can be used in combination with the excitation windings 2x, 2y and the intermediate rotating winding M1, M2 and thus, an optimal form can be embodied when being combined with the excitation windings 2x, 2y and the intermediate rotating windings M1, M2.

(7) According to the preferred embodiment, when the coil pattern P is to be formed, by forming it in the square wave shape along the circumferential direction Ff by combining the circumferential conductor portions Wo . . . , Wi . . . , and the radial conductor portions Wm . . . , and by setting the width dimensions Lo, Li of the circumferential conductor portions Wo . . . , Wi . . . larger than the width dimension Lm of the radial conductor portions Wm . . . , electric resistance of the entire coil pattern P can be made smaller and thus, detection efficiency of the resolver 1 can be improved by increasing a generated effective magnetic-flux density.

DESCRIPTION OF REFERENCE NUMERALS

1: Resolver, 2x: Excitation winding, 2y: Excitation winding, 3: Detection winding, 4: Fixed body, 5: Rotating body, D: Predetermined electrical phase, Sx: Excitation signal, Sy: Excitation signal, So: Detection signal, θ: Displacement amount, M1: Intermediate rotating winding, M2: Intermediate rotating winding, Mx1: Winding portion, My1: Winding portion, Mx2: Winding portion, My2: Winding portion, B: Disc shape, Fd: Radial direction, R: Cylinder shape, Fc: Axial direction, Xp: Position detection winding, Xm: Position detection winding, P: Coil pattern, Ci: Sheet coil, Cm1: Sheet coil, Cm2: Sheet coil, Co: Sheet coil, Ff: Circumferential direction, Wo . . . : Circumferential conductor portion (conductor portion), Wi . . . : Circumferential conductor portion (conductor portion), Wm . . . : Radial conductor portion (conductor portion), Lo: Width dimension, Li: Width dimension, Lm: Width dimension, H: Closed circuit

BEST MODE FOR CARRYING OUT THE INVENTION

Subsequently, a preferred embodiment according to the present invention will be described in detail on the basis of the drawings.

First, configuration of the resolver 1 according to this embodiment will be described specifically by referring to FIGS. 1 to 7 and FIG. 9.

Figure 2:
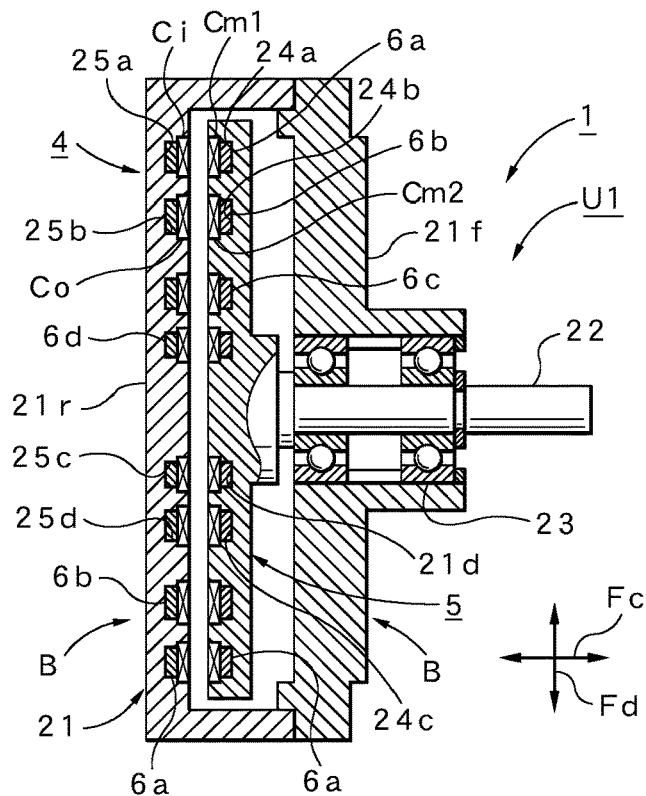
FIG. 2 is a side sectional view illustrating an internal structure of the resolver main-body portion of the resolver.
Figure 9:
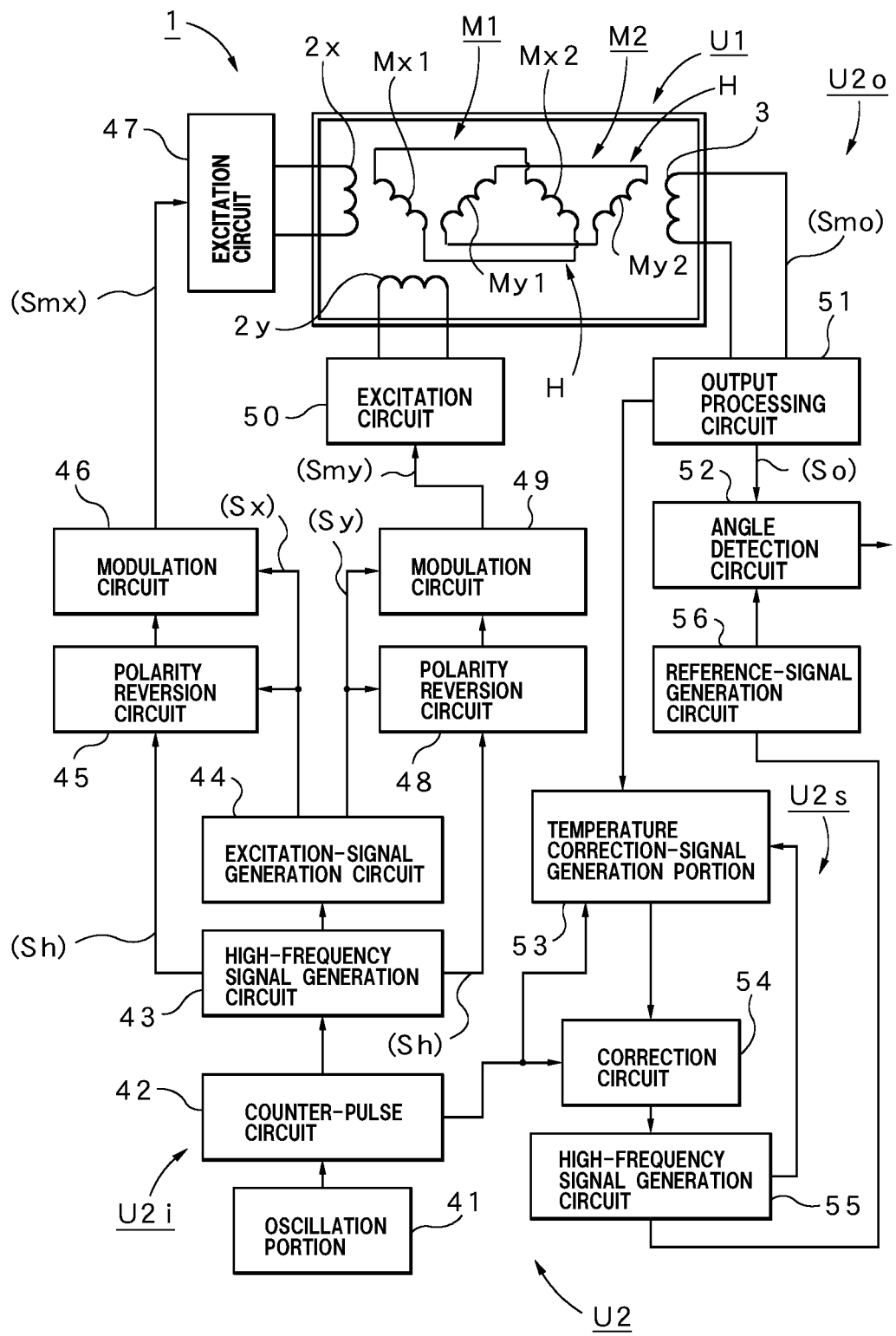
FIG. 9 is a block circuit diagram of a signal processing portion of the resolver according to this embodiment.

The resolver 1 roughly includes a resolver main-body portion U1 constituted by a magnetic system and a mechanical system shown in FIG. 2 and the like and a signal processing portion U2 constituted by an electric system shown in FIG. 9.

The resolver main-body portion U1 includes a casing 21 with a circular plan view (front surface view in the axial direction Fc) having a hollow inside. Inside the casing 21, a rotating body 5 configured in a disc shape B is accommodated, and at a center position of this rotating body 5, a rotating shaft 22 protruding forward in the axial direction Fc is fixed. This rotating shaft 22 is rotatably supported by a bearing 23 provided at a center of a front surface portion 21f of the casing 21. And a rear surface portion 21r of the casing 21 opposed to this rotating body 5 functions as a fixed body 4 in the disc shape B.

Moreover, in a surface of the rotating body 5 opposed to the fixed body 4, winding-accommodating recess grooves 24a, 24b, 24c, and 24d forming four concentric circles with different diameters are formed. That is, from the winding-accommodating recess groove 24a with the largest diameter on the outer peripheral side to the winding-accommodating recess groove 24d with the smallest diameter on the center side, they are sequentially formed at predetermined intervals in the radial direction Fd. In this case, the winding-accommodating recess grooves 24a and 24b are desirably proximate to each other as much as possible. An inside of each of the winding-accommodating recess grooves 24a . . . is formed by a core accommodating portion on an inner side (bottom portion side) and a coil accommodating portion on an outer side (front surface side). On the other hand, also in a surface of the fixed body 4 opposed to the rotating body 5, similar winding-accommodating recess grooves 25a, 25b, 25c, and 25d opposed to (faced with) each of the winding-accommodating recess grooves 24a, 24b, 24c, and 24d, respectively, are formed. That is, from the winding-accommodating recess groove 25a with the largest diameter on the outer peripheral side to the winding-accommodating recess groove 25d with the smallest diameter on the center side, they are sequentially formed at predetermined intervals in the radial direction Fd. An inside of each of the winding-accommodating recess grooves 25a . . . is also formed by a core accommodating portion on an inner side (bottom portion side) and a coil accommodating portion on an outer side (front surface side) similarly to each of the winding-accommodating recess grooves 24a . . . .

Subsequently, a magnetic core and a sheet coil accommodated in each of the winding-accommodating recess grooves 24a, 25a . . . will be described specifically.

Figure 7:
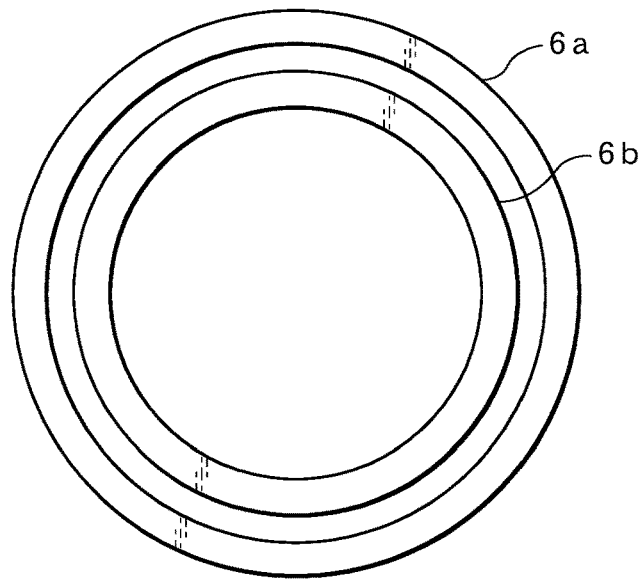
FIG. 7 is a plan view of a magnetic core used for each winding of the resolver.

FIG. 7 illustrates a magnetic core 6a accommodated in the winding-accommodating recess grooves 24a, 25a, respectively, and a magnetic core 6b accommodated in the winding-accommodating recess grooves 24b, 25b, respectively. Each of the magnetic cores 6a, 6b is formed in a ring shape with a predetermined thickness integrally molded by a magnetic body such as ferrite or the like, for example, and a section thereof is formed in a rectangular shape as shown in FIG. 2. Therefore, a core surface in contact with each of the sheet coils Ci . . . , which will be described later, is a flat surface. Moreover, the magnetic cores 6a and 6b can be formed similarly except a point that the diameters are different. Therefore, the magnetic core 6a can be used by preparing two identical magnetic cores and as shown in FIG. 2, by accommodating the one magnetic core 6a in the core accommodating portion on the inner side of the winding-accommodating recess groove 24a (bottom portion side) and the other magnetic core 6a in the core accommodating portion on the inner side of the winding-accommodating recess groove 25a (bottom portion side). Moreover, the magnetic core 6b can be also used, similarly to the magnetic core 6a, by preparing two identical magnetic core and by accommodating the one magnetic core 6b in the core accommodating portion on the inner side of the winding-accommodating recess groove 24b (bottom portion side) and the other magnetic core 6b in the core accommodating portion on the inner side of the winding-accommodating recess groove 25b (bottom portion side). Though detailed illustration of the magnetic cores 6c, 6d accommodated in the other winding-accommodating recess grooves 24c, 25c, 24d, 25d is omitted, they can be formed similarly to the magnetic core 6a (6b) except the point that the diameters are different.

Subsequently, specific configuration of the sheet coil Ci constituting the pair of excitation windings 2x, 2y will be described.

Figure 4:
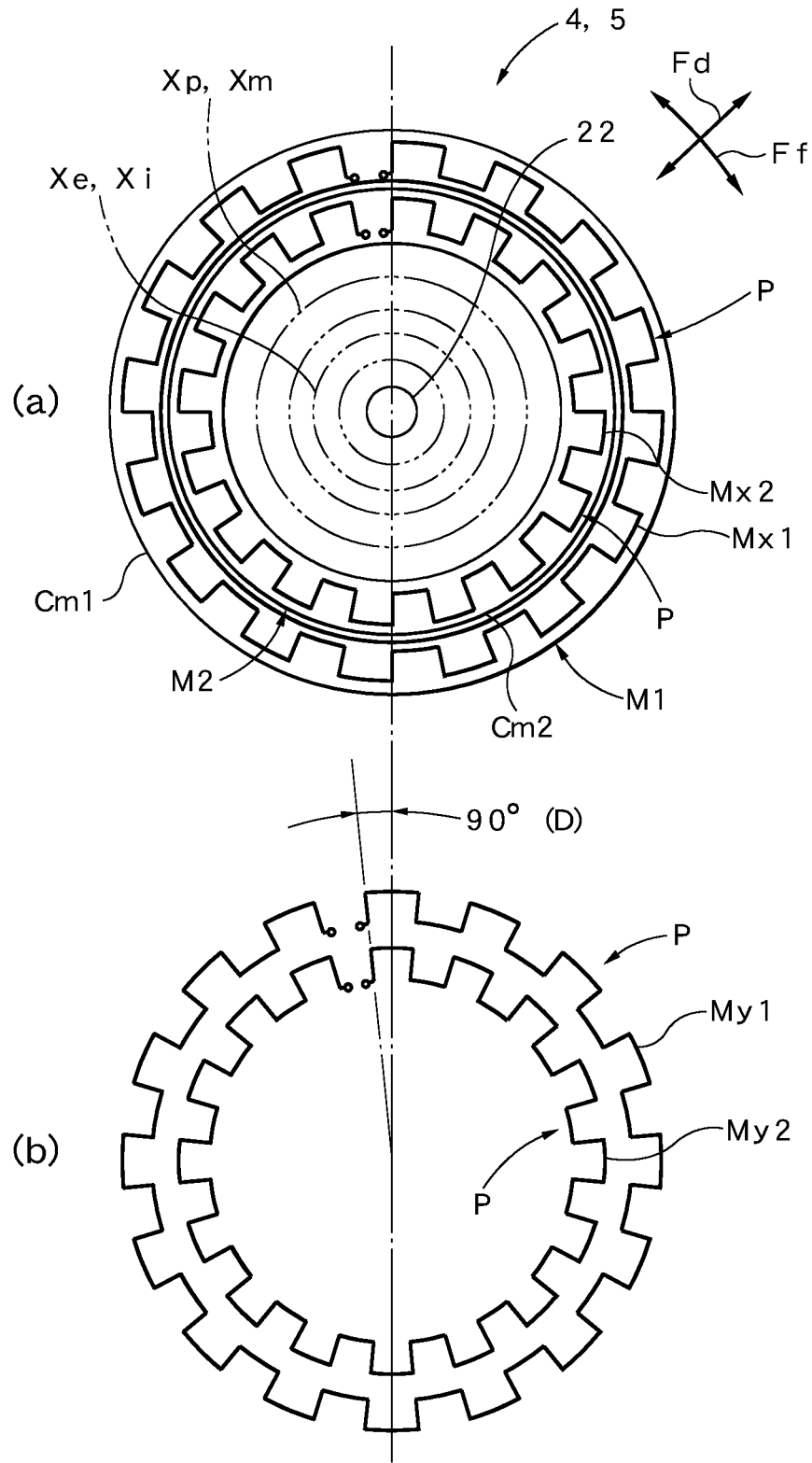
FIG. 4 is a plan view and a back view of a sheet coil used for an intermediate rotating winding (excitation winding) of the resolver.
Figure 5:
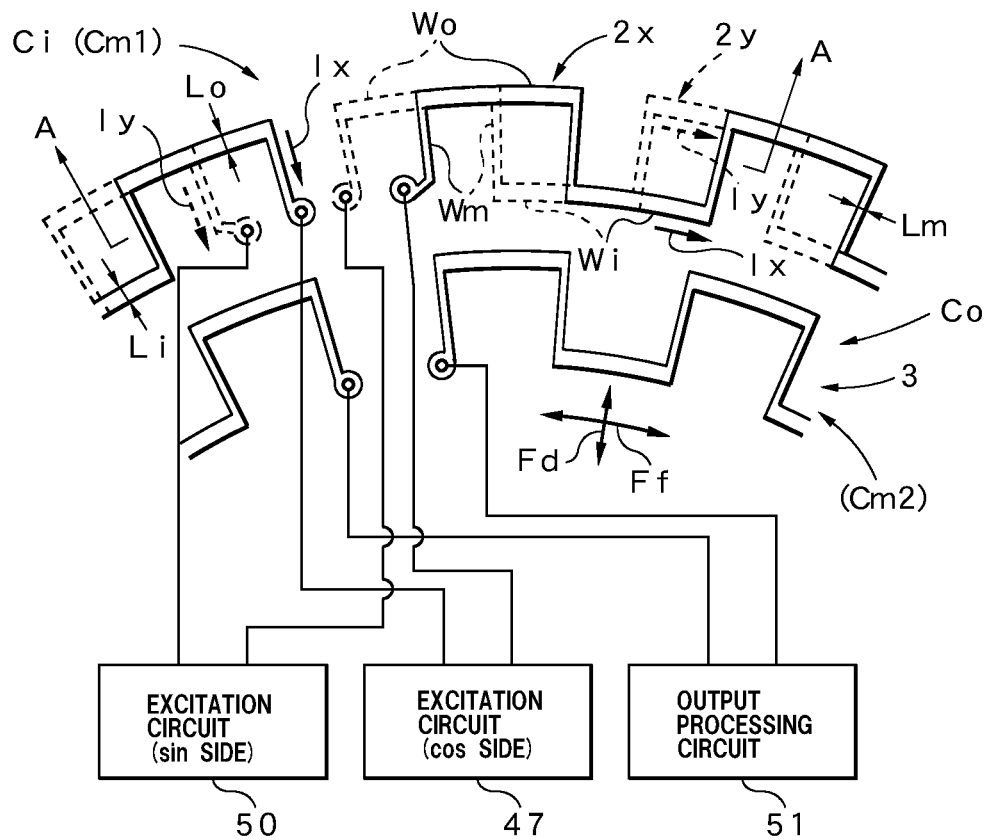
FIG. 5 is a partially extracted enlarged view of the sheet coil used for the resolver.
Figure 6:
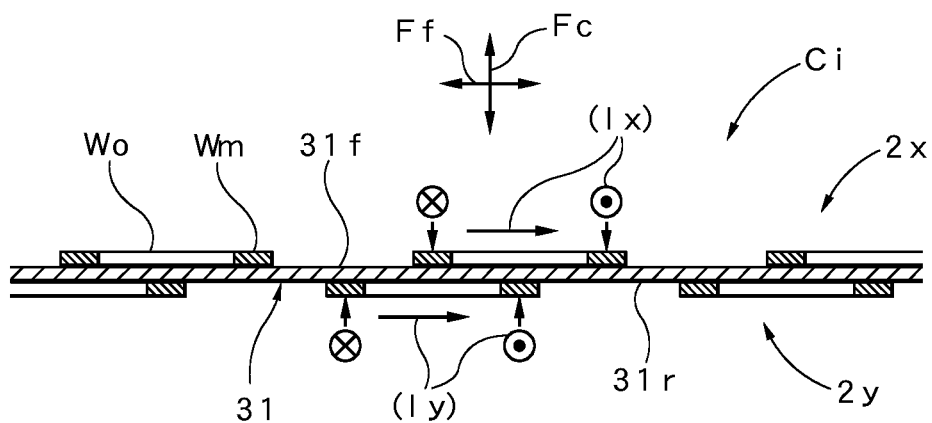
FIG. 6 is an A-A line sectional view in FIG. 5.

The sheet coil Ci has, as shown in FIGS. 4 to 6, a sheet portion 31 formed by an insulating substrate in a ring shape, and on a front surface (one of surfaces) 31f of this sheet portion 31, a coil portion of the one excitation winding (excitation winding on the sin side) 2x by a conductor (copper foil) shown in FIG. 4(a) is formed, while on a rear surface (the other surface) 31r of the sheet portion 31, a coil portion of the other excitation winding (excitation winding on the cos side) 2y by the conductor (copper foil) shown in FIG. 4(b) is formed. As a result, the sheet coil Ci is entirely constituted as a flexible printed circuit board (FPCB).

The one excitation winding 2x is formed by a multipolar-mode coil pattern P. FIG. 4 illustrates a case where the number of pole pairs of "16" (32 poles) was selected. In the exemplification, a thickness of the sheet portion 31 is 0.02 [mm], and a thickness of the coil pattern P to be a conductive portion is 0.015 [mm]. The case where the number of pole pairs of "16" was selected is shown, but this number of pole pairs is optional. At the present, the number of pole pairs from "2" to "512" can be assumed, but the number of pole pairs larger than the above number would be assumed to be put into practice in the future. Moreover, the other excitation winding 2y is also formed by the multipolar-mode coil pattern P which is the same as that of the one excitation winding 2x, and as shown in FIGS. 4(a), 4(b), a predetermined electric phase D is made different from that of the one excitation winding 2x. Specifically, the electric phase D is set to 90 [°]. As a result, the one excitation winding 2x functions as a winding which processes the excitation signal Sx on the sin phase side, which will be described later, while the other excitation winding 2y functions as a winding which processes the excitation signal Sy on the cos phase side, which will be described later.

The coil pattern P is, as shown in FIG. 5 and FIG. 6, formed in a square wave shape along the circumferential direction Ff by combining the conductor portions Wo, Wi in the circumferential direction Ff (circumferential conductor portion) and the conductor portion Wm in the radial direction (radial conductor portion). At this time, the width dimensions Lo, Li of the circumferential conductor portions Wo, Wi are set larger than the width dimension Lm of the radial conductor portion Wm. Specifically, it is preferable that the width dimensions Lo, Li of the circumferential conductor portions Wo . . . , Wi . . . are selected at 1.5 to 3.5 times of the width dimension Lm of the radial conductor portion Wm . . . . By configuring as above, electric resistance of the entire coil pattern P can be made small and thus, a generated effective magnetic-flux density can be increased so as to improve detection efficiency of the resolver 1.

As described above, the sheet coil Ci of the excitation windings 2x, 2y is configured. Moreover, the other sheet coils Cm1, Cm2, Co can be also configured basically similarly to the sheet coil Ci. That is, the sheet coil Cm1 constituting the intermediate rotating winding M1 used by being opposed to the sheet coil Ci by being accommodated in the winding-accommodating recess groove 24a is configured similarly to this sheet coil Ci. Therefore, two pieces of the sheet coils Ci . . . are prepared, and one of them can be used as the sheet coil Ci, while the other can be used as the sheet coil Cm1. Moreover, the sheet coil Cm2 constituting the intermediate rotating winding M2 accommodated in the winding-accommodating recess groove 24b is accommodated in the second winding-accommodating recess groove 24b from the outer peripheral side and thus, as shown in FIG. 4, it can be configured similarly to the sheet coil Cm1 (Ci) except a point that the diameter is formed smaller as compared with the sheet coil Cm1 (Ci).

When the excitation windings 2x, 2y and the intermediate rotating windings M1, M2 are configured as above, by configuring a pair of the coil patterns P, P with the predetermined electric phases D made different by the multipolar mode by the sheet coils Ci, Cm1, Cm2 formed on the front and back, respectively, the entire thickness including the excitation windings 2x, 2y and the intermediate rotating windings M1, M2 can be reduced and thus, they can be embodied as an optimal mode in realizing the super small-sized resolver 1.

On the other hand, the sheet coil Co constituting the detection winding 3 is accommodated in the second winding-accommodating recess groove 25b from the outer peripheral side and thus, it can be formed similarly to the sheet coil Cm2 constituting the intermediate rotating winding M2, and the coil pattern P is formed only on one of the front and back surfaces of the sheet portion 31. That is, since the detection winding 3 is constituted by a single winding portion, the coil pattern P to be used only needs to be formed at least on one of the front surface 31f and the rear surface 31r of the sheet portion 31. Note that a correction winding or the like may be provided on the other surface as necessary. In the exemplified case, it is only necessary that the sheet coil excluding the coil pattern P on the one side from the sheet coil Cm2 is formed.

When the detection winding 3 is configured as above, by forming the coil pattern P in the multipolar mode by the sheet coil Co disposed at least on one of the front and the back, the entire thickness of the detection winding 3 can be thinned, and it can be used in combination with the excitation windings 2x, 2y and the intermediate rotating windings M1 and M2 and thus, it can be embodied as an optimal mode when combined with the excitation windings 2x, 2y and the intermediate rotating windings M1, M2. Note that Co in FIG. 5 denotes the sheet coil Co.

Figure 3:
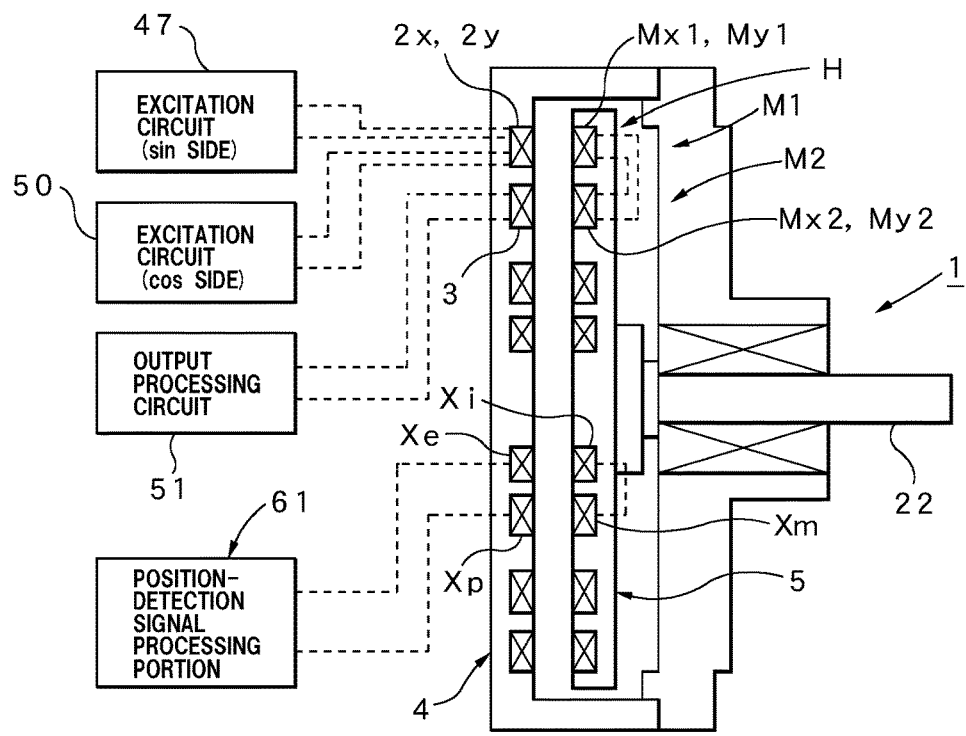
FIG. 3 is a schematic sectional configuration diagram for explaining winding disposition of the resolver.

And as shown in FIG. 2 and FIG. 3, the sheet coil Ci including the excitation windings 2x, 2y is accommodated in the winding-accommodating recess groove 25a of the fixed body 4, and the sheet coil Co including the detection winding 3 is accommodated in the second winding-accommodating recess groove 25b from the outer peripheral side. On the other hand, the sheet coil Cm1 including the intermediate rotating winding M1 is accommodated in the winding-accommodating recess groove 24a of the rotating body 5, and the sheet coil Cm2 including the intermediate rotating winding M2 is accommodated in the second winding-accommodating recess groove 24b from the outer peripheral side.

As described above, when the resolver 1 is to be configured, by configuring the fixed body 4 and the rotating body 5 in the disc shape, respectively, by disposing the excitation windings 2x, 2y and the detection winding 3 at different positions in the radial direction Fd of the fixed body 4, and by disposing a plurality of sets of the intermediate rotating windings M1, M2 by being opposed to the excitation windings 2x, 2y and the detection winding 3, particularly the entire thickness in the axial direction Fc can be reduced and thus, the thin-type resolver 1 can be easily obtained.

On the other hand, in the third winding-accommodating recess grooves 24c, 25c from the outer peripheral side, position detection windings Xp, Xm which detect a reference position of the rotating body 5 are provided. In the exemplified case, a pair of the position detection winding (sheet coil) Xp and the position detection winding (sheet coil) Xm are provided by using each of the winding-accommodating recess grooves 24c, 25c, and a primary winding (sheet coil) Xi and a secondary winding (sheet coil) Xe of an output transformer which outputs a detection signal by the position detection windings Xp, Xm are provided by using each of the winding-accommodating recess grooves 24d and 25d located closest to the center side. In this case, the position detection windings Xp, Xm only need to detect a mechanical one rotation position (reference position) of the rotating body 5, for example, and thus, various publicly-known configurations can be employed.

As described above, by providing the position detection windings Xp, Xm which detect the reference position of the rotating body 5 in the region other than the region where the excitation windings 2x, 2y and the detection winding 3 in the fixed body 4 and the rotating body 5 are disposed, the mechanical one rotation position of the rotating body 5 can be detected accurately as described above, and the absolute-type resolver 1 can be easily constructed by effectively using an unused region.

Subsequently, the configuration of the signal processing portion U2 used by being connected to the aforementioned resolver main-body portion U1 and a connecting method of each winding (winding portion) will be described by referring to FIGS. 1 to 3 and FIG. 9.

Figure 1:
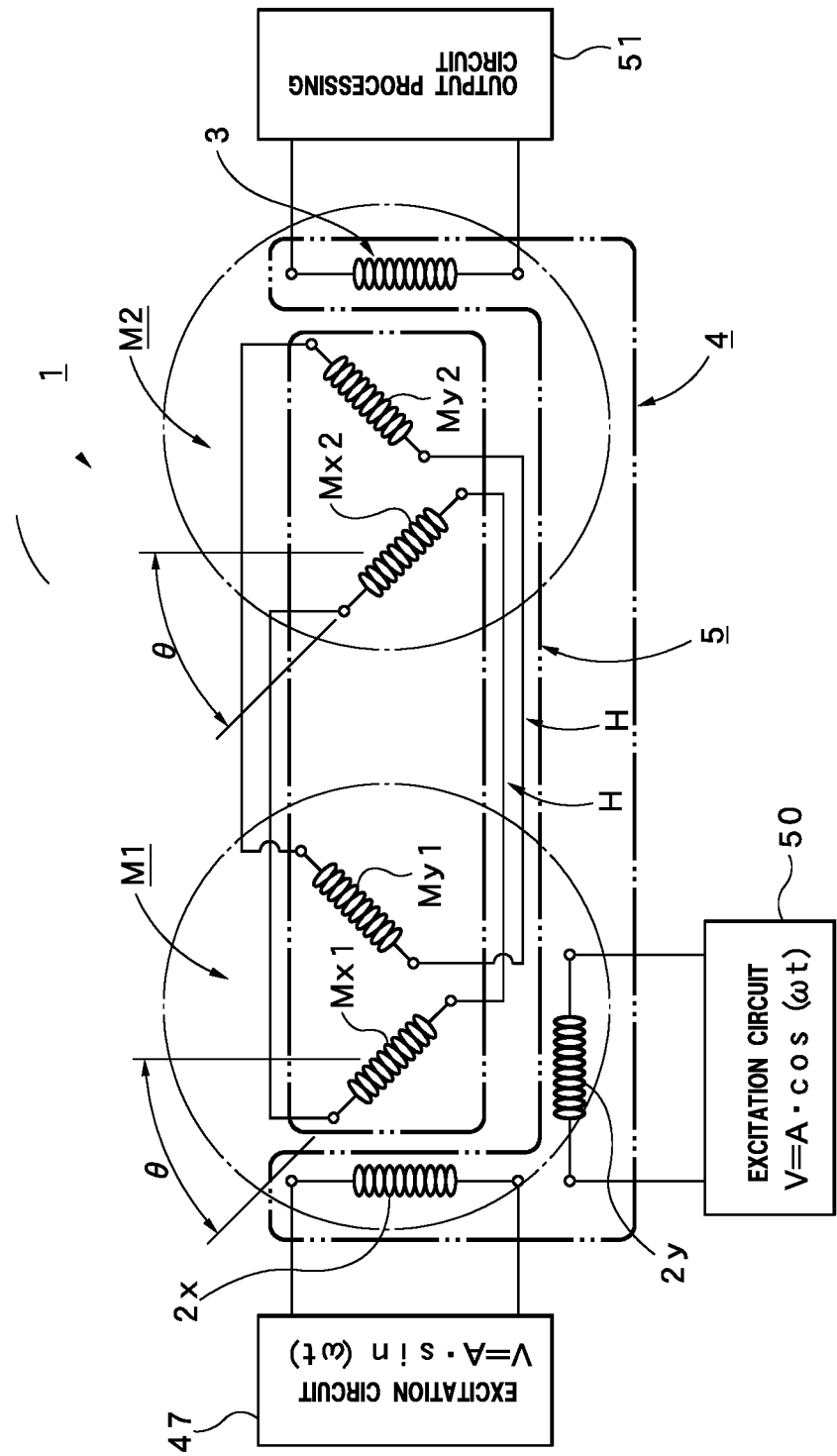
FIG. 1 is a principle circuit diagram of a resolver main-body portion of a resolver according to a preferred embodiment of the present invention.

First, as shown in FIG. 1 and FIG. 3, the excitation winding 2x on one side (sin side) is connected to an excitation circuit 47 which excites this excitation winding 2x, the excitation winding 2y on the other side (cos side) is connected to an excitation circuit 50 which excites this excitation winding 2y. Moreover, the detection winding 3 is connected to an output processing circuit 51. Furthermore, the winding portion Mx1 on one side (sin side) constituting the intermediate rotating winding M1 and the winding portion Mx2 on one side (sin side) constituting the intermediate rotating winding M2, that is, the winding portions Mx1 and Mx2 in the same phase are connected in parallel so as to configure a closed circuit H, and the winding portion My1 on the other side (cos side) constituting the intermediate rotating winding M1 and the winding portion My2 on the other side (cos side) constituting the intermediate rotating winding M2, that is, the winding portions My1 and My2 in the same phase are connected in parallel so as to configure the closed circuit H. On the other hand, in the exemplified case, the position detection winding (sheet coil) Xp and the secondary winding (sheet coil) Xe are connected to the position-detection signal processing portion 61, and the position detection winding (sheet coil) Xm and the primary winding (sheet coil) Xi are connected to each other.

On the other hand, FIG. 9 illustrates a specific circuit diagram of the signal processing portion U2. In FIG. 9, the same reference signs are given to the same portions as those in FIGS. 1 to 7 so as to clarify the configuration. This signal processing portion U2 includes an input-side circuit U2i, and this input-side circuit U2i includes a counter-pulse circuit 42 which generates a counter pulse on the basis of a clock signal generated by an oscillation portion 41, a high-frequency signal generation circuit 43 which generates a high-frequency signal with a frequency of approximately 1 [MHz] on the basis of this counter pulse, and an excitation-signal generation circuit 44 which generates the excitation signals Sx (A·sin ωt), Sy (A·cos ωt) on the basis of this high-frequency signal. Moreover, a polarity reversion circuit 45 into which the one excitation signal Sx is input and which reverses the polarity of the high-frequency signal and outputs it at a polarity reversion position of the excitation signal Sx, a modulation circuit 46 which modulates an amplitude of the excitation signal Sx by the high-frequency signal output from this polarity reversion circuit 45, and an excitation circuit 47 which supplies a modulation signal Smx output from this modulation circuit 46, that is, the amplitude-modulated excitation signal Sx to the one excitation winding 2x are included, and also a polarity reversion circuit 48 into which the other excitation signal Sy is input and which reverses the polarity of the high-frequency signal and outputs it at the polarity reversion position of the excitation signal Sy, a modulation circuit 49 which modulates an amplitude of the excitation signal Sy by the high-frequency signal output from this polarity reversion circuit 48, and an excitation circuit 50 which supplies a modulation signal Smy output from this modulation circuit 49, that is, the amplitude-modulated excitation signal Sy to the other excitation winding 2y are included. Furthermore, U2o is an output-side circuit and includes an output processing circuit 51 which demodulates a modulation signal Smo output by being connected to the detection winding 3 and outputs the detection signal So and an angle detection circuit 52 to which the detection signal So obtained from this output processing circuit 51 is given.

On the other hand, U2s is a phase correction circuit which corrects a phase error generated between the excitation signals Sx, Sy and the detection signal So, and this phase correction circuit U2s includes a temperature correction-signal generation portion 53 which generates a correction signal on the basis of a temperature drift, a correction circuit 54 which corrects the counter pulse output from the counter-pulse circuit 42 by the correction signal output from this temperature correction-signal generation portion 53, a high-frequency signal generation circuit 55 which generates a high-frequency signal on the basis of the corrected counter pulse output from this correction circuit 54, and a reference-signal generation circuit 56 which generates a reference signal on the basis of the high-frequency signal output from this high-frequency signal generation circuit 55, and the reference signal generated by this reference-signal generation circuit 56 is given to the angle detection circuit 52. Note that the temperature correction-signal generation portion 53 includes a temperature-drift detection function which separates a high-frequency signal component from the modulation signal Smo obtained via the output processing circuit 51 and detects an error component by the temperature drift of the high-frequency signal component on the basis of the obtained high-frequency signal component, the counter pulse output from the counter-pulse circuit 42, and the high-frequency signal output from the high-frequency signal generation circuit 55, and includes a correction-signal generation function which generates the correction signal described above on the basis of the error component obtained from this temperature-drift detection function.

Subsequently, an operation of the resolver 1 according to this embodiment including the configuration as above will be described by referring to FIG. 10 and each figure.

First, a clock signal output from the oscillation portion 41 shown in FIG. 9 is given to the counter-pulse circuit 42, whereby a counter pulse is generated. This counter pulse is given to an input side of the high-frequency signal generation circuit 43 and input sides of the temperature correction-signal generation portion 53 and the correction circuit 54, respectively. In the high-frequency signal generation circuit 43, a high-frequency signal with a frequency of approximately 1 [MHz] is generated on the basis of the counter pulse, and this high-frequency signal is given to the input side of the excitation-signal generation circuit 44, whereby the excitation signals Sx, Sy are generated.

And the one excitation signal Sx is given to the modulation circuit 46 and the polarity-reversion circuit 45, respectively, and in the modulation circuit 46, the excitation signal Sx given by the excitation-signal generation circuit 44 is amplitude-modulated by the high-frequency signal given by the polarity-reversion circuit 45, and the modulation signal Smx obtained by this is given to the one excitation winding 2x through the excitation circuit 47. At this time, the polarity of the high-frequency signal is reversed by the polarity-reversion circuit 45 at each polarity-reversion position of the excitation signal Sx. As a result, the excitation winding 2x is excited by the modulation signal Smx, and a high-frequency current by the modulation signal Smx flows in this excitation winding 2x. That is, as shown in FIG. 5, a current Ix indicated as an example by a solid-line arrow flows in the coil pattern P (excitation winding 2x) on the front surface side of the sheet coil Ci.

Moreover, the other excitation signal Sy is given to the modulation circuit 49 and the polarity-reversion circuit 48, respectively, and in the modulation circuit 49, the excitation signal Sy given by the excitation-signal generation circuit 44 is amplitude-modulated by the high-frequency signal given by the polarity-reversion circuit 48, and the modulation signal Smy obtained by this is given to the other excitation winding 2y through the excitation circuit 50. At this time, the polarity of the high-frequency signal given by the high-frequency signal generation circuit 43 is reversed by the polarity-reversion circuit 48 at each polarity-reversion position of the excitation signal Sy. As a result, the excitation winding 2y is excited by the modulation signal Smy, and a high-frequency current by the modulation signal Smy flows in this excitation winding 2y. That is, as shown in FIG. 5, a current Iy indicated as an example by a dotted-line arrow flows in the coil pattern P on the rear surface side of the sheet coil Ci.

Figure 10:
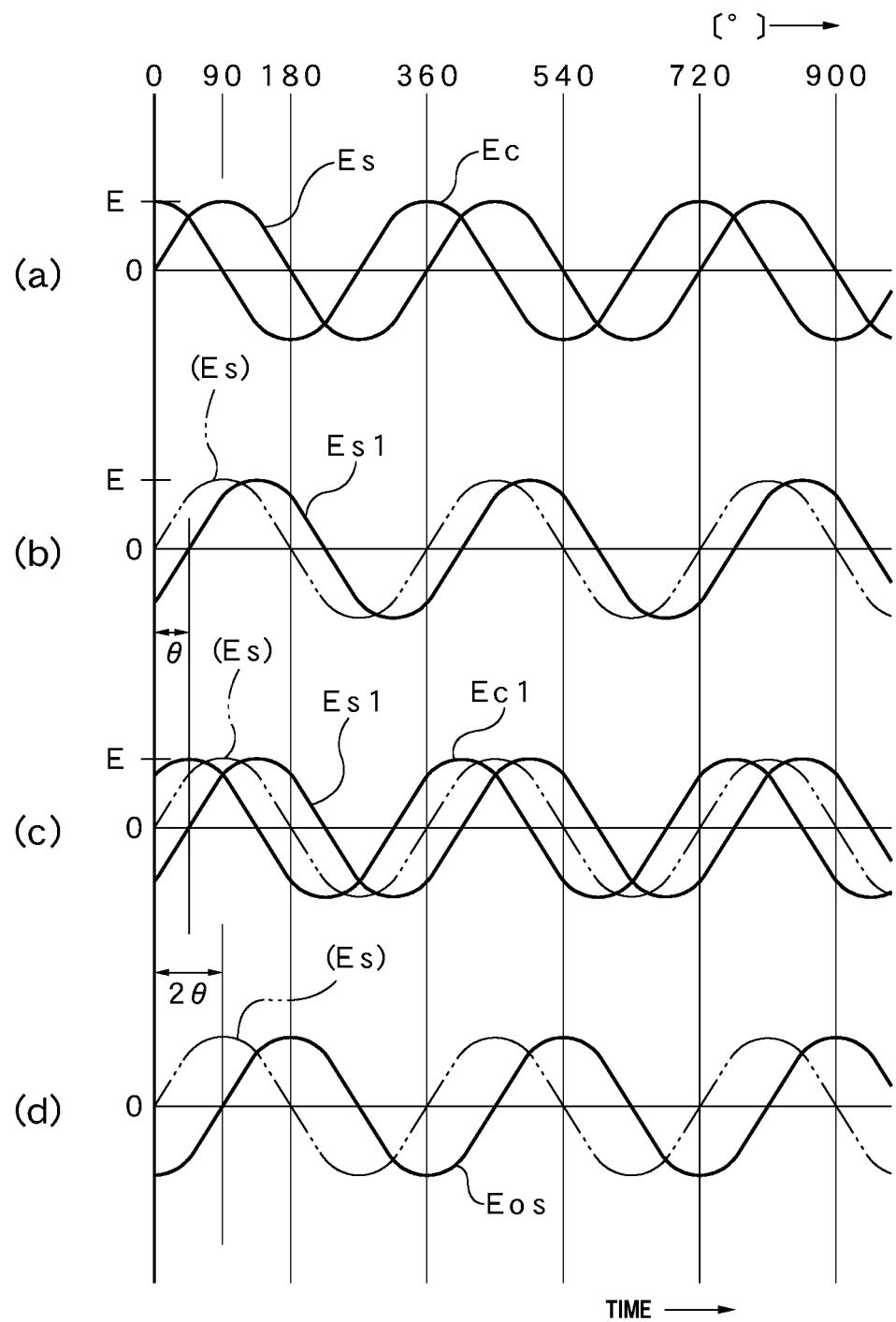
FIG. 10 is a timing chart of a signal waveform in each part of the resolver.

In his case, excitation voltages applied between the current Ix and the current Iy, that is, between the excitation winding 2x and the excitation winding 2y, have a phase difference of 90 [°] as an electric angle and thus, as shown in FIG. 10($a$), a voltage of Es=E·sin $\omega$t is added to the excitation winding 2x, and a voltage of Ec=E cos $\omega$t is added to the excitation winding 2y. And when the rotating body 5 is rotated/displaced only by a predetermined angle ($\theta$), that is, a predetermined displacement amount $\theta$, an inductive voltage Es1=E·sin($\omega$t+$\theta$) shown in FIG. 10($b$) is generated (output) in the one winding portion Mx1 of the intermediate rotating winding M1, and an inductive voltage Ec1=E·cos ($\omega$t+$\theta$) shown in FIG. 10($c$) is generated (output) in the other winding portion My1 of the intermediate rotating winding M1.

Moreover, the outputs of the intermediate rotating winding M1, that is, the inductive voltages Es1 and Ec1 are applied to the one winding portion Mx2 and the other winding portion My2 in the intermediate rotating winding M2, respectively. In this case, the voltage applied to the intermediate rotating winding M2 becomes a voltage changed only by an angle $\theta$ (displacement amount $\theta$), and each of the winding portion Mx2 and the winding portion My2 is excited. As a result, a voltage Eos induced on the basis of the output of the intermediate rotating winding M2 is generated in the detection winding 3. This voltage Eos is a voltage obtained by adding the induced voltages Es1 and Ec1 changed only by the angle $\theta$ and the induced voltages Es2 and Ec2 changed only by the angle $\theta$, generated in the intermediate rotating winding M2. That is, the voltage Eos generated in the intermediate rotating winding M2 and induced in the detection winding 3 is Eos=E'·sin ($\omega$t+2$\theta$), and a phase change angle theoretically becomes twice of the rotation angle of the rotating shaft 22, that is, "$\theta$ X 2". FIG. 10($d$) illustrates the voltage Eos output from the detection winding 3. As described above, regarding the output relationship in the resolver 1, by assuming that the number of poles of the excitation windings 2x, 2y are Nx, Ny, the substantial number of poles output from the intermediate rotating winding M2 is Nx+Ny (more generally, Nx±Ny).

On the other hand, the voltage Eos output from the detection winding 3 is the modulation signal Smo, and this modulation signal Smo is given to the output processing circuit 51, and the modulation signal Smo is demodulated. As a result, the detection signal So is acquired and is given to the angle detection circuit 52. Moreover, in the output processing circuit 51, the high-frequency signal component is separated from the modulation signal Smo, and the separated high-frequency signal component is given to the temperature correction-signal generation portion 53 having the temperature-drift detection function. As a result, in the temperature correction-signal generation portion 53, the error component by the temperature drift of the high-frequency signal component is detected on the basis of the high-frequency signal component separated by the high-frequency signal separation function, the counter pulse obtained from the counter-pulse circuit 52, and the high-frequency signal obtained from the high-frequency signal generation circuit 55, the correction signal is generated on the basis of this error component, and this correction signal is given to the correction circuit 54. And in the correction circuit 54, the counter pulse given by the counter-pulse circuit 42 is corrected by the correction signal. That is, the error component by the temperature drift is excluded.

On the other hand, the corrected counter pulse obtained from the correction circuit 54 is given to the high-frequency signal generation circuit 55, and the high-frequency signal is generated on the basis of the counter pulse. The high-frequency signal obtained from the high-frequency-signal generation circuit 55 is given to the temperature correction-signal generation portion 53, and by means of the reference-signal generation function in the temperature correction-signal generation portion 53, the reference signal is generated on the basis of the high-frequency signal. This reference signal is given to the angle detection circuit 52, and the angle detection circuit 52 generates a reference pulse from the reference signal and generates a detection pulse from the detection signal So. Then, the counter pulses are counted between a rise of the reference pulse and the rise of the detection pulse, and this count value is converted to an angle, and a rotation angle ($\theta$) of the rotating shaft 22, that is, a targeted displacement amount $\theta$ is acquired. Specifically, a relationship between the count value and the rotation angle is compiled into a database in advance, and a rotation angle corresponding to the count value may be read out of the database, or it may be acquired by calculation by using a function formula set in advance.

Thus, according to the resolver 1 as above according to this embodiment, as a basic configuration, the excitation windings 2x, 2y constituted by the multipolar mode (32 poles) and the detection winding 3 are disposed coaxially with the fixed body 4, and the two sets (M1, M2) (plural sets in general) of intermediate rotating windings M1 . . . constituted by the multipolar mode (32 poles) and constituted by the pair of winding portions Mx1, My1 . . . with the predetermined electric phases D made different (90 [°]) are disposed coaxially with the rotating body 5, and the winding portions in the same phase of the two sets of intermediate rotating windings M1, M2 (Mx1 and Mx2, My1 and My2) are connected, respectively, so as to form the closed circuits H . . . and thus, the substantial number of poles can be increased while ensuring the machining accuracy, and the small-sized resolver 1 which can sufficiently satisfy the demand for higher detection accuracy and moreover, higher stability and higher reliability or particularly the super small-sized resolver 1 with the diameter of approximately 5 [mm] can be easily realized. Furthermore, since the output transformer can be excluded by disposing the detection winding 3 on the fixed body 4, contribution can be made to further size reduction and cost reduction.

Figure 8:
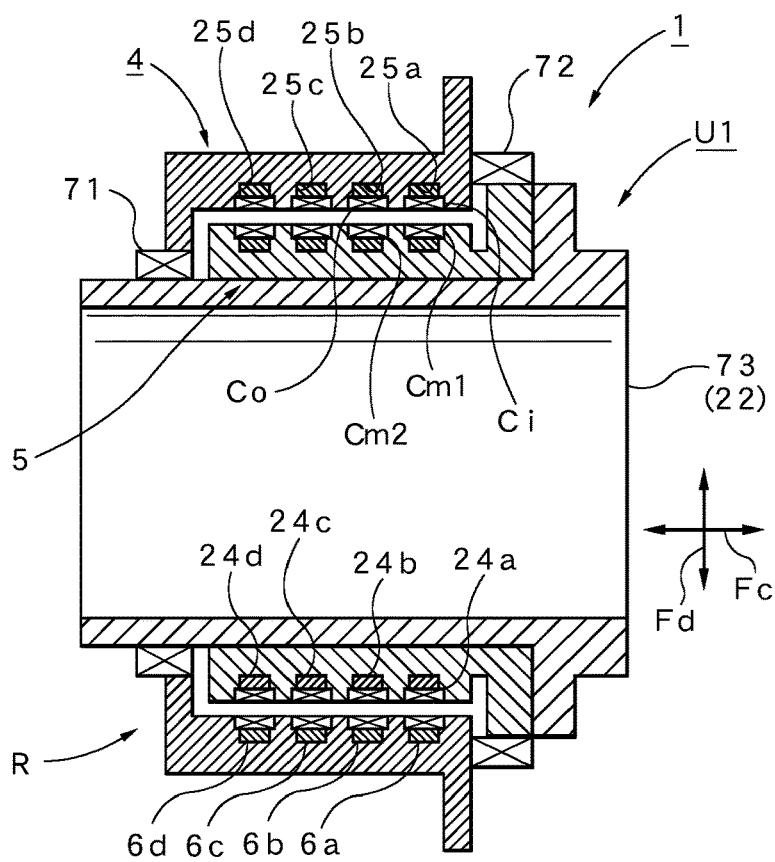
FIG. 8 is a side sectional view illustrating an internal structure of a resolver main-body portion of a resolver according to a modified embodiment of the present invention.

FIG. 8 illustrates the resolver 1 according to a modified embodiment. In this resolver 1, the fixed body 4 and the rotating body 5 are configured in the cylindrical shape R, respectively, and the excitation windings 2x, 2y and the detection winding 3 are disposed at different positions in the axial direction Fc of the fixed body 4, and a plural sets of the intermediate rotating windings M1, M2 are disposed by being opposed to the excitation windings 2x, 2y and the detection winding 3. By configuring as in the modified embodiment, particularly the entire dimension in the radial direction Fd can be made smaller and thus, the thin-type resolver 1 can be easily obtained and at the same time, wirings such as a connection cable and the like can be passed through a space formed inside.

Note that, in FIG. 8, reference numerals 71, 72 denote bearings, and reference numeral 73 denotes a cylindrical support cylinder which supports an inner peripheral surface of the fixed body 4 with a cylindrical shape R. Therefore, in the exemplified case, the support cylinder 73 also serves as the rotating shaft 22. FIG. 8 is shown in a mode related to FIG. 2, but the fixed body 4 in FIG. 8 may be the rotating body 5, and the rotating body 5 in FIG. 8 may be the fixed body 4. As described above, in the resolver 1 according to the embodiment in FIG. 2, the rotating body 5 is configured by in the disc shape B, and each of the windings 2x, 2y, 3, M1, M2 is disposed in the radial direction Fd, while the resolver 1 according to the modified embodiment shown in FIG. 8 is different in points that the rotating body 5 is configured in the cylindrical shape R, and each of the windings 2x, 2y, 3, M1, M2 is disposed in the axial direction Fc, but a basic principle structure is the same. Therefore, in FIG. 8, the same reference signs are given to the same portions as those in FIG. 2 so as to clarify the structures thereof, and detailed description thereof is omitted.

As described above, the preferred embodiments including the modified embodiment have been described in detail, but the present invention is not limited to such embodiments but is capable of arbitrary changes, additions or deletions within a range not departing from the gist of the present invention in the configurations, shapes, materials, quantities, numeral values, and the like of details.

For example, such embodiment was illustrated that, for the excitation windings 2x, 2y, the modulation signals Smx, Smy obtained by amplification-modulation of the excitation signals Sx, Sy by a high-frequency signal Sh and by reversing the polarity of the high-frequency signal Sh at the polarity-reversion positions of the excitation signals Sx, Sy are input, and the detection signal So is obtained by demodulating the modulation signal Smo output from the detection winding 3, but such a case is not excluded that the excitation signals Sx, Sy are input into the excitation windings 2x, 2y without modulation and the displacement amount θ of the rotating body 5 is detected on the basis of the detection signal So output from the detection winding 3. Moreover, 90 [°] is illustrated as the electric phase D, but the other phases are not excluded. Furthermore, two sets of the intermediate rotating windings M1, M2 are illustrated as the plural sets of the intermediate rotating windings M1, . . . , but such a case where three or more sets of the intermediate rotating windings M1 . . . are provided is not excluded. On the other hand, as the shapes of the fixed body 4 and the rotating body 5, formation with the disc shape B or the cylindrical shape R is illustrated, but a shape combining the disc shape B and the cylindrical shape R can be also embodied. Moreover, regarding the magnetic cores 6a . . . , the surfaces in contact with the sheet coils Ci . . . may be formed with irregularity, and by forming an opening or a notch to be fitted with the irregular shape in the sheet coil Ci . . . , the magnetic cores 6a . . . and the sheet coils Ci . . . may be configured capable of assembling. Note that regarding the coil pattern P, the width dimensions Lo, Li of the circumferential conductors Wo . . . , Wi . . . are preferably set larger than the width dimension Lm of the radial conductor portion Wm . . . , but the case of setting them the same and the case of setting them smaller are not excluded. On the other hand, in the fixed body 4 and the rotating body 5, a region other than the region where the excitation winding 2 and the detection winding 3 are disposed can be also used for applications other than those exemplified.

INDUSTRIAL APPLICABILITY

The resolver according to the present invention can be used for various applications for detecting a displacement amount (rotation angle) of a rotating body by including an excitation winding and a detection winding.

The invention claimed is:
1. A resolver comprising:
a fixed body; and
a rotating body disposed coaxially,
wherein excitation signals are input to a pair of excitation windings disposed on the fixed body with predetermined electrical phases made different,
wherein a displacement amount of the rotating body is detected on the basis of a detection signal output from a detection winding disposed on the fixed body,
wherein the excitation windings and the detection winding configured in a multipolar mode are disposed coaxially with the fixed body,
wherein a plurality of sets of intermediate rotating windings configured by a pair of winding portions configured in the multipolar mode and with the predetermined electrical phases made different are disposed coaxially with the rotating body, the plurality of sets of intermediate rotating windings being disposed on the rotating body and opposed to the excitation windings and the detection winding, and
wherein the winding portions in the same phase of the plurality of sets of intermediate rotating windings are connected so as to form closed circuits, respectively.

2. The resolver according to claim 1, wherein the fixed body and the rotating body are configured in a disc shape, respectively, the excitation windings and the detection winding are disposed at different positions in a radial direction of the fixed body, and the plurality of sets of intermediate rotating windings are disposed by being opposed to the excitation windings and the detection winding.

3. The resolver according to claim 1, wherein the fixed body and the rotating body are configured in a cylindrical shape, respectively, the excitation windings and the detection winding are disposed at different positions in an axial direction of the fixed body, and the plurality of sets of intermediate rotating windings are disposed by being opposed to the excitation windings and the detection winding.

4. The resolver according to claim 1, wherein the fixed body and the rotating body include position-detection windings that detect a reference position of the rotating body on a region other than the region on which the excitation windings and the detection winding are disposed.

5. The resolver according to claim 1, wherein the excitation windings and the intermediate rotating windings are configured by sheet coils in which a pair of coil patterns with the predetermined electrical phases made different by the multipolar mode are formed on a front and a back, respectively.

6. The resolver according to claim 1, wherein the detection winding is formed by a sheet coil in which the coil pattern in the multipolar mode is disposed at least on one of the front and the back.

7. The resolver according to claim 5, wherein the coil pattern is formed in a square wave shape along a circumferential direction by combining conductor portions in the circumferential direction and conductor portions in a radial direction, and a width dimension of the circumferential conductor portions is set larger than a width dimension of the radial conductor portions.

8. The resolver according to claim 2, wherein the fixed body and the rotating body include position-detection windings that detect a reference position of the rotating body on a region other than the region on which the excitation windings and the detection winding are disposed.

9. The resolver according to claim 3, wherein the fixed body and the rotating body include position-detection windings that detect a reference position of the rotating body on a region other than the region on which the excitation windings and the detection winding are disposed.

10. The resolver according to claim 6, wherein the coil pattern is formed in a square wave shape along a circumferential direction by combining conductor portions in the circumferential direction and conductor portions in a radial direction, and a width dimension of the circumferential conductor portions is set larger than a width dimension of the radial conductor portions.

11. A resolver comprising:
a fixed body; and
a rotating body disposed coaxially,
wherein excitation signals are input to a pair of excitation windings disposed on the fixed body with predetermined electrical phases made different,
wherein a displacement amount of the rotating body is detected on the basis of a detection signal output from a detection winding,
wherein the excitation windings and the detection winding configured in a multipolar mode are disposed coaxially with the fixed body,
wherein a plurality of sets of intermediate rotating windings configured by a pair of winding portions configured in the multipolar mode and with the predetermined electrical phases made different are disposed coaxially with the rotating body,
wherein the winding portions in the same phase of the plurality of sets of intermediate rotating windings are connected so as to form closed circuits, respectively, and
wherein the fixed body and the rotating body are configured in a disc shape, respectively, the excitation windings and the detection winding are disposed at different positions in a radial direction of the fixed body, and the plurality of sets of intermediate rotating windings are disposed by being opposed to the excitation windings and the detection winding.

12. A resolver comprising:
a fixed body; and
a rotating body disposed coaxially,
wherein excitation signals are input to a pair of excitation windings disposed on the fixed body with predetermined electrical phases made different,
wherein a displacement amount of the rotating body is detected on the basis of a detection signal output from a detection winding,
wherein the excitation windings and the detection winding configured in a multipolar mode are disposed coaxially with the fixed body,
wherein a plurality of sets of intermediate rotating windings configured by a pair of winding portions configured in the multipolar mode and with the predetermined electrical phases made different are disposed coaxially with the rotating body,
wherein the winding portions in the same phase of the plurality of sets of intermediate rotating windings are connected so as to form closed circuits, respectively, and
wherein the fixed body and the rotating body are configured in a cylindrical shape, respectively, the excitation windings and the detection winding are disposed at different positions in an axial direction of the fixed body, and the plurality of sets of intermediate rotating windings are disposed by being opposed to the excitation windings and the detection winding.

* * * * *